United States Patent

[11] 3,599,815

| [72] | Inventor | Italo Bianchi<br>Nice, France |
|---|---|---|
| [21] | Appl. No. | 846,645 |
| [22] | Filed | July 18, 1969 |
| [45] | Patented | Aug. 17, 1971 |
| [73] | Assignee | S. A. R. L. Bianchi Freres & Co.<br>"BOXDAD,"<br>Nice, France |
| [32] | Priority | Oct. 4, 1966, Mar. 7, 1967 |
| [33] | | France |
| [31] | | 8064 and 97779 |
| | | Continuation of application Ser. No.<br>671,049, June 27, 1967, now abandoned. |

[54] CHARIOT FOR THE TRANSPORT OF VEHICLES MAINLY FOR PARKING ON DIFFERENT FLOOR LEVELS
7 Claims, 9 Drawing Figs.

[52] U.S. Cl. .................................... 214/331,
214/16.1 CA
[51] Int. Cl. ...................................... E04 6/06
[50] Field of Search .......................... 224/16.1,
16.14, 16.14 H, 330—333

[56] References Cited
UNITED STATES PATENTS
| 2,016,662 | 10/1935 | Aitken | 105/27 |
| 2,931,316 | 4/1960 | Blackwell | 104/172 |
| 2,967,634 | 1/1961 | Bogar et al. | 214/331 |
| 3,240,364 | 3/1966 | Kapnek et al. | 214/16.1 (4-E) |

FOREIGN PATENTS
| 967,023 | 8/1964 | Great Britain | |
| 1,154,661 | 4/1958 | France | |

*Primary Examiner*—Gerald M. Forlenza
*Assistant Examiner*—Raymond B. Johnson
*Attorneys*—Nelson E. Kimmelman and Maleson, Kimmelman & Ratner ABSTRACT: The present invention concerns a carriage for parking vehicles such as automobiles in multilevel parking garages. The carriage consists of a lower, wheeled carrier and an upper frame assembly which rests upon the carrier. The frame assembly includes at each wheel a plurality of horizontal, spring-loaded rods or pins which are normally biased toward the outside. Before the automobile is set on the carriage, the rods are drawn inwardly. When the tires or wheels are opposite their respective sets of inwardly drawn shafts, the rods are moved outwardly. Some of the rods will engage the tire or wheel, others will move even further out, just in front of and in back of each tire so that forward or backward motion of the car is prevented. The rods also support the car when it is lifted from the lower carrier assembly.

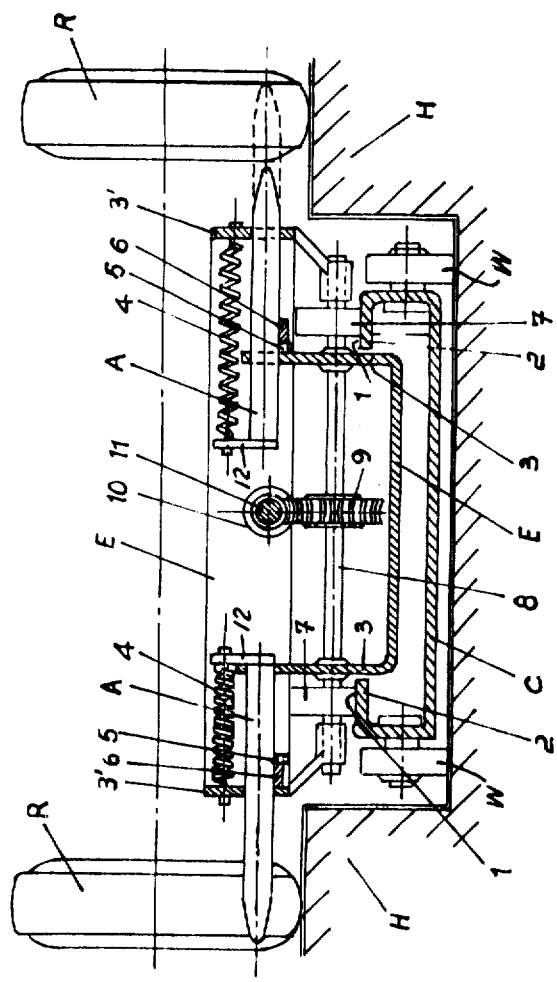

CHARIOT FOR THE TRANSPORT OF VEHICLES MAINLY FOR PARKING ON DIFFERENT FLOOR LEVELS

BACKGROUND OF THE INVENTION

This invention is a streamlined continuation of U.S. Pat. application 671,049 filed Sept. 27, 1967 now abandoned and relates to a carriage to transfer vehicles into the proper stall in multilevel garages.

BRIEF SUMMARY OF THE INVENTION

This invention is for a carriage for transporting vehicles such as automobiles and the like, into the proper stall in multilevel garages. It consists of a lower, wheeled carrier on which is supported an upper frame assembly having at predetermined wheel positions a plurality of horizontal rods which move axially inwardly and outwardly against the respective wheels or tires so as to immobilize the vehicle on the frame and enable the vehicle to be lifted relative to the carrier.

BRIEF DESCRIPTION OF THE DRAWINGS

FIG. 3 is a transverse section of the carriage.

DETAILED DESCRIPTION OF THE DRAWINGS

Figure 4:
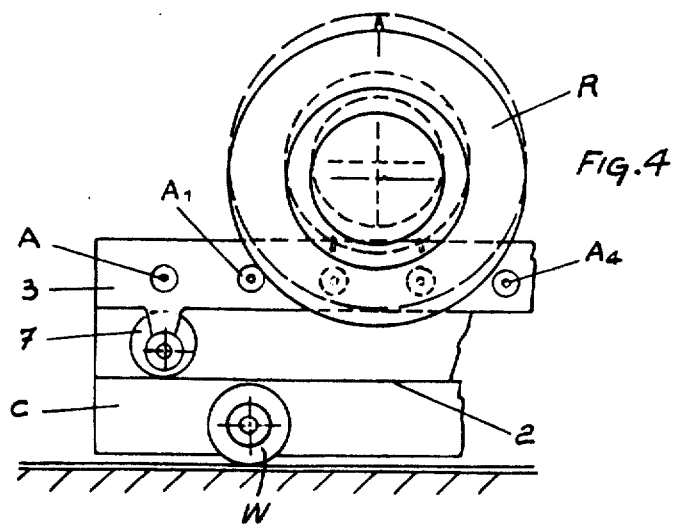
FIG. 4 is a fragmentary side view of part of the apparatus shown in FIG. 3.
Figure 1:
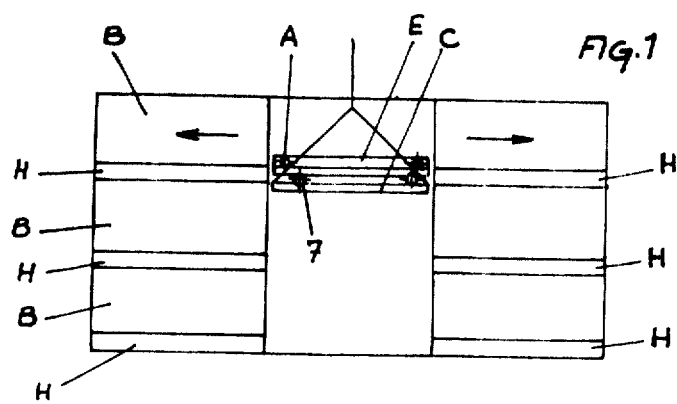
FIG. 1 is a schematic elevation view of the apparatus.
Figure 2:
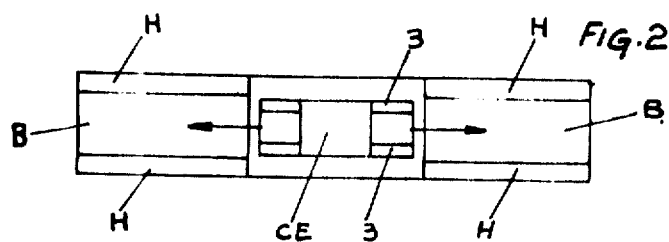
FIG. 2 is a schematic plan view of the apparatus.
Figure 5:
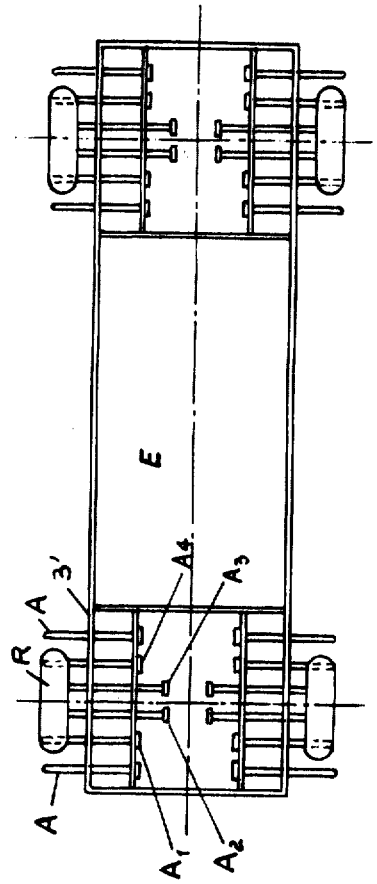
FIG. 5 is a schematic, plan view of the upper frame taken from a point just above the wheels and looking downward showing how the horizontal rods are disposed with relation to the wheels.
Figure 6:
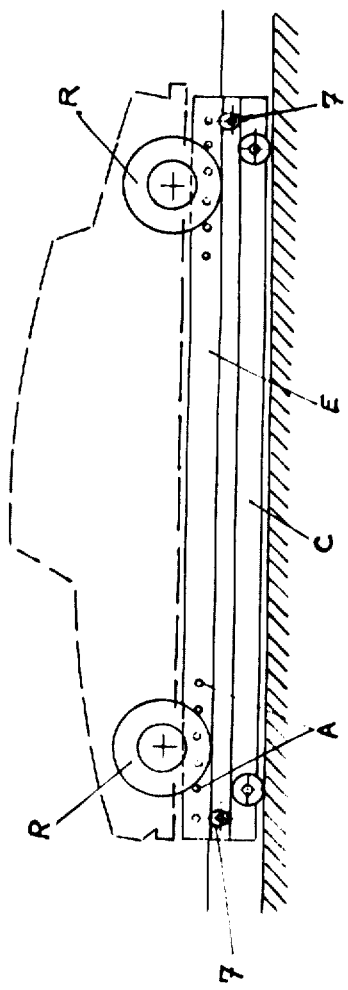
FIG. 6 is a side elevation, partly in phantom, showing a vehicle resting on the upper frame member.

Referring now to FIGS. 1—6 the parking carriage is composed of two parts, the lower carrier itself designated C and the upper frame assembly E having a plurality of horizontally extending rods A. There are four eccentric rollers 7 mounted on axles 8 that are journaled through vertical walls 3 of the frame member. The eccentric rollers 7 rest upon supporting faces 1 of the horizontal rails 2. The vertical portions 3 extend below the inner edges of rails 2 to prevent transverse horizontal displacement of the frame with respect to the carrier C.

The upper frame assembly E includes two vertical sidewalls 3' which are substantially parallel to one another and disposed parallel to the longitudinal axis of the upper frame assembly. At the front left and right and rear left and right portions of the sidewalls 3' there are disposed a plurality of horizontal rods A which are mounted for axial movement inwardly and outwardly. Each of the bars has an associated lower projection or stop 5 which is engaged by a longitudinal bar 6 to move the rods inwardly and outwardly. The end of each rod is connected to an upright member 12 that limits the outward movement of each bar and also is connected to a spring 4 whose other end is connected to the wall 3. The spring 4 normally urges each of the rods A outwardly. As shown in FIG. 3, the left-hand rod A is disposed in front of the left tire R and is in its outermost position. The right-hand rod A in the same figure is shown in its most inward position in response to the inward movement of the longitudinal bar 6 against the associated stop 5. It will be seen by reference to FIGS. 5 and 6 how there are always two of the rods A, for example rods $A_1$ and $A_4$ which engage and immobilize the associated wheel. On the other hand, the rods $A_2$ and $A_3$ cannot move fully outward under urging of their associated springs 4 since their ends will make contact with the inner sidewall of the wheel or tire on the wheel. The pressure of the springs 4 should be such that rods $A_2$ and $A_3$ do not damage or injure the tires or wheels. As a matter of fact, the end of each of the rods can be fitted with an appropriate shock absorbing member (not shown).

To operate the apparatus, the upper frame E whose rods A have been moved inwardly by their controlling longitudinal bars 6 and which rests on carrier C, is placed under the vehicle to be transported whose tires R rest on the tire-engaging members or runners H which are elevated above the floor in the stall or compartment B into which carriage C moves. Then the longitudinal bars 6 are moved outwardly so that the rods A are enabled to be urged by their associated springs 4 outwardly until they engage either the inner sidewalls of the tires R or the treads as the case may be. The vehicle may then be removed by lifting the upper frame assembly E which rests on the horizontal rails 2 by means of the four eccentric rollers 7 mounted on the front and rear roller axles 8. Each of the axles 8 is connected to a worm gear 9 which meshes with a worm 10 mounted on a shaft 11 that runs substantially parallel to the axis of the upper frame E. The worm 10 may be turned, for example, by a reversible electric motor (not shown). This lifting action is shown, for example, in FIG. 4 wherein the wheel R is gripped between the two horizontal rods $A_1$ and $A_4$ in the position shown in full lines. When the eccentrics 7 are rotated 180°, the vertical walls 3 and the rods $A_1$ and $A_4$ will lift the wheel R to the position shown in phantom.

Control of the transverse movement of longitudinal bars 6, which move the horizontal rods A in and out can be achieved in any conventional manner. For example, there could be a longitudinal driving shaft like 11 powered by a reversible motor in response to remote control similar to the structure shown in FIGS. 7 and 8. The driving shaft would have a worm mounted on it which meshes with a worm gear mounted in the center of a transverse shaft that is journaled for rotation in appropriate bearings. This shaft could be essentially similar to shaft 17, FIG. 7. The transverse shaft would have two sets of threads running in opposite directions on each side of the worm gear. At the end of each bar 6 there would be a nut (similar to nut 20, FIG. 7) engaging one of the oppositely threaded portions of the transverse shaft. Thus, upon rotation of the longitudinal shaft and its associated worm, the bars would be moved inwardly and outwardly depending on the direction of rotation of the motor, in substantially the same manner as the supporting members 16 are moved inwardly and outwardly as shown in FIGS. 7 and 8.

The plurality of horizontal, wheel-engaging rods A could alternatively be mounted directly to the carrier C, but it is better to mount them to the movable upper frame resting upon the lower carrier so that they are capable of being lifted or lowered.

The means of lifting the frame E relative to carrier C need not be coupled directly to the upper frame; since it involves relative displacement between the upper and lower portions of carriage C the lifting means could also be mounted on the carrier C.

Figure 7:
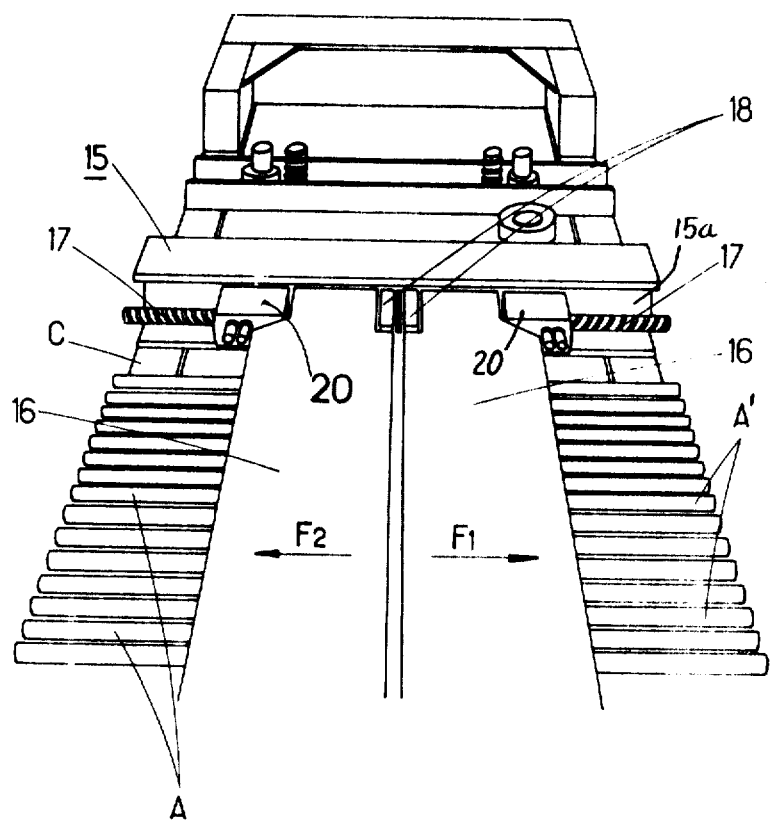
FIG. 7 is a perspective view of another embodiment of the invention showing the carriage ready to receive a vehicle to be parked.
Figure 8:
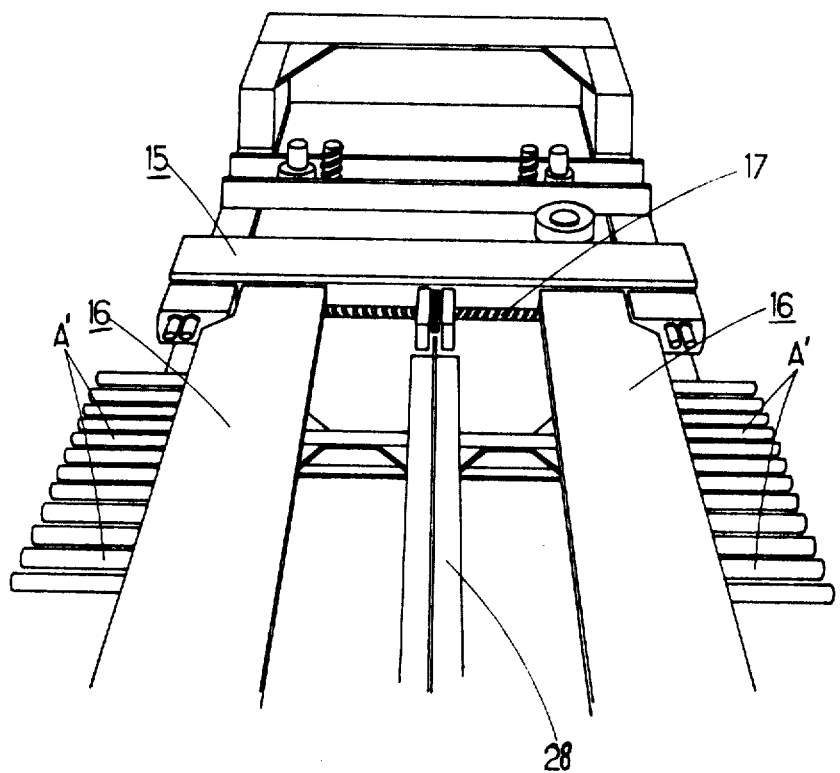
FIG. 8 is a perspective view o the apparatus shown in FIG. 7 with the horizontal rods shown in their outward positions.
Figure 9:
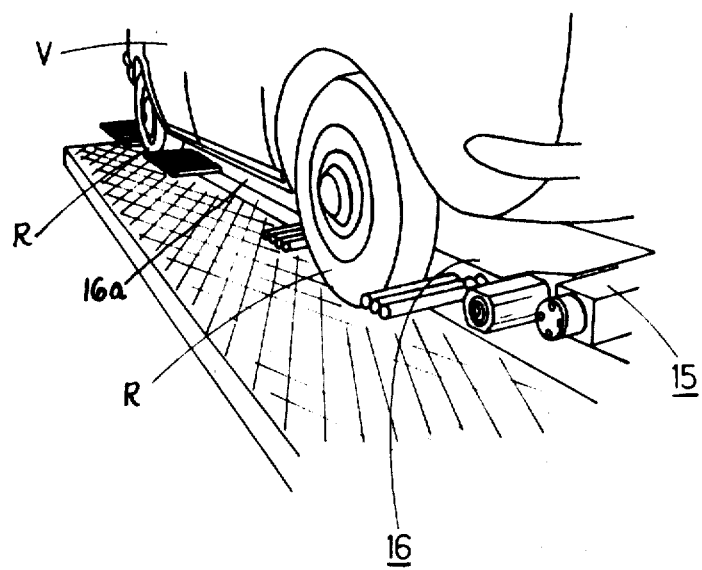
FIG. 9 is a perspective view, taken from the rear of the vehicle, showing the horizontal rods in place for blocking the wheels of the vehicle.

In the embodiment of the present invention shown in FIG. 7, the carriage C includes two l-sectioned crossbars 15 (only one shown) disposed in proximity to the lateral bars of the carrier. Means are provided for moving two longitudinal beams 16 parallel to and toward and away from one another. Each beam has sets of rods A' mounted without springs through apertures in its external sidewalls 16a. As above stated, they are designed to immobilize the vehicle to be transported on the carriage and to lift it.

A screw 17 is mounted through pillow blocks or bearings 18 which are fixed or integral with the channel 15a of crossbar 15. The screw 17 has a left-half portion with a thread running opposite the thread in the right-half portion. The nuts 20 engage the screw 17 and are fixed to respective ones of the beams 16. A worm gear 9' is fixedly mounted about and to the screw 17 at its center between blocks 18. The gear 9' may be driven by a worm attached to a shaft driven by an electrically reversible motor that may be controlled from a distance, if desired. Rotation of the screw 17 in one direction causes the beams 16 to move apart; in the other it causes them to approach one another (see arrows F1 and F2). The ends of the beams 16 move within the channels 15a of the beams 15.

At a certain point in the separation of the beams 16, certain of the rods A come into contact with the inner sidewalls of the tires 19 of the wheels of the vehicle V. These rods, being immobilized despite the continued outward movement of the beams 16, slide to the interior of the beams while the neighboring rods which are not blocked by the tires come to press against the tread of the tires blocking the vehicle in the longitudinal direction. The beams then continue to move apart until their external sidewalls 16a press against the tires. At this time, the beams are stopped automatically by virtue of the action of a limit switch which may be mounted at any convenient point on the sidewalls 16a and which stops the motor. Thus the vehicle is immobilized in all directions by the joint action of the beams and the rods.

It should be noted also that the nuts 20 may be pivotally mounted upon a vertical axis with respect to their connection to the beams 16 so that the beams can take a position which is not parallel to the axis of the carriage when they abut the sidewalls of the tires of the vehicle. This permits them to automatically adjust for any differences of tire paths existing between the tires in the front and the tires in the back of the vehicle as well as to take into account the possible oblique or skewed position of the vehicle with respect to the axis of the carriage.

When the carriage lifts the vehicle, the rods support the tires without any risk of axial displacement of the vehicle. When the vehicle is placed in place in a predetermined stall of the garage, the frame is lowered as in FIG. 1 and the tires of the vehicle make contact with the runners of the stall. Then the motor driving the worm gear 9' is switched, manually or automatically, to cause the screw 17 to turn in an opposite direction in order to retract the two beams 16. Since the rods A' are not spring-loaded as in the first embodiment those of the rods A' which formerly abutted the inner sidewalls of the tires will not resume their normal position until their innermost ends make contact with the T-beam 28 disposed along the longitudinal axis of the carriage. When the beams are fully retracted the outer ends of all of the rods A' will again be protruding and aligned as in FIG. 7 whereupon the carriage is ready for another use.

This device has a number of advantages and permits a simple construction of a carriage with the means for efficiently immobilizing the vehicle it transports.

FIGS. 7 and 8 are partial and show only some of the plurality of the wheel-immobilizing and associated structures. It should be understood, however, that the other parts of the carriage which are not shown are identical and symmetrical.

In still another embodiment, the beams 16 could be driven by pneumatic or hydraulic jacks. In this case, the apparatus would include four jacks to lift the vehicle and four jacks to move the beams. If jacks are used, it would not be necessary to have a cutoff switch to stop the beams when they abut the inner surfaces of the tires.

I claim:

1. A carriage for vehicles which are transported by elevating means and are stored in and retrieved from selected stalls in multilevel garages, comprising:

a. a lower, wheeled carrier assembly,
   b. an upper frame assembly detachably resting upon said carrier assembly and on which a vehicle is to be set, said frame assembly including
      1. a plurality of sets of substantially parallel rods for engaging respective wheels of said vehicle,
      2. guides in which said rods are individually movable axially in a direction substantially transverse to the longitudinal axis of said frame,
      3. means for moving said sets of rods to an outer position in which said sets of rods engage said respective wheels, the spacing of said rods of each set being such that at least one of the rods of the set abuts the inner lateral surface of the associated wheel and at least two others of said set engage the periphery of said wheel thereby immobilizing said wheel and enabling it to be lifted by said wheels when said frame assembly is raised relative to said carrier assembly, said moving means also moving said sets to an inward retracted position wherein said rods are withdrawn from contact with said wheels, said moving means including two elongated members disposed substantially parallel to the longitudinal axis of said frame which move toward and away from one another and cooperate with said rods to move them to said wheel-engaging and retracted positions, and
   c. means connected to at least one of said (a) or (b) assemblies and resting on said carrier assembly for raising said frame assembly relative to said carrier assembly.

2. The carriage according to claim 1 wherein said rods extend outwardly from said two elongated members and wherein said members are respectively coupled to two oppositely threaded portions of a rotary shaft which is coupled to driving means.

3. The carriage according to claim 1 wherein said rods in said retracted position are in their maximum protruding position in their guides and all the rods of each set are substantially aligned with one another, and wherein only those rods coming into abutting contact with the lateral inner surface of the associated wheel are prevented from moving to their maximum protrusion from said guides when said sets are moved outwardly.

4. The carriage according to claim 1 wherein said rods in said retracted position are in their minimum protruding position from their guides and all the rods of each set are substantially aligned with one another, and wherein said sets are moved to their outermost position, only those rods which come into abutting contact with the lateral surface of the associated wheel are prevented from moving into their maximum protrusion from said guides.

5. The carriage according to claim 3 wherein said elongated members are movable beams, wherein said guides are formed in said beams, an wherein said rods move freely in either direction in said guides.

6. The carriage according to claim 4 wherein said rods are normally biased to protrude outwardly from their guides, wherein said elongated members are longitudinal movable bars which cooperate with said rods to permit said rods to move outwardly as said bars move outwardly and wherein said bars cooperate with said rods to move said rods inwardly against said bias.

7. The carriage according to claim 5 wherein said beams are mounted to allow them to skew as they move said rods to the wheel-engaging position.